US009644096B2

(12) United States Patent
Myles et al.

(10) Patent No.: US 9,644,096 B2
(45) Date of Patent: May 9, 2017

(54) METHOD FOR GENERATION OF NANOPARTICLES

(71) Applicant: XEROX CORPORATION, Norwalk, CT (US)

(72) Inventors: Andrew J. Myles, Edmonton (CA); Karen A. Moffat, Brantford (CA); Valerie M. Farrugia, Oakville (CA); Jordan H. Wosnick, Toronto (CA)

(73) Assignees: XEROX CORPORATION, Norwalk, CT (US); NATIONAL RESEARCH COUNCIL OF CANADA, Ontario (CA)

(*) Notice: Subject to any disclaimer, the term of this patent is extended or adjusted under 35 U.S.C. 154(b) by 0 days.

(21) Appl. No.: 15/191,252

(22) Filed: Jun. 23, 2016

(65) Prior Publication Data
US 2016/0297966 A1 Oct. 13, 2016

Related U.S. Application Data

(62) Division of application No. 13/938,555, filed on Jul. 10, 2013, now Pat. No. 9,399,704.

(51) Int. Cl.
*C08G 63/64* (2006.01)
*C08L 69/00* (2006.01)
*C08J 3/05* (2006.01)
*C08G 63/91* (2006.01)

(52) U.S. Cl.
CPC ............ *C08L 69/005* (2013.01); *C08G 63/64* (2013.01); *C08G 63/912* (2013.01); *C08J 3/05* (2013.01); *C08J 2369/00* (2013.01); *C08L 2314/00* (2013.01)

(58) Field of Classification Search
CPC .................................. C08J 3/05; C08G 63/64
See application file for complete search history.

(56) References Cited

U.S. PATENT DOCUMENTS

| | | | |
|---|---|---|---|
| 8,952,126 B2 | 2/2015 | Myles et al. | |
| 8,975,344 B2 | 3/2015 | Myles et al. | |
| 9,000,101 B2 | 4/2015 | Myles et al. | |
| 9,080,012 B2 | 7/2015 | Farrugia et al. | |
| 2007/0299504 A1* | 12/2007 | Gale | A61L 27/48 623/1.15 |

(Continued)

OTHER PUBLICATIONS

Pounder, Ryan J. et al., "Towards poly(ester) nanoparticles: recent advances in the synthesis of functional poly(ester)s by ring-opening polymerization", Polym. Chem., 2010, 1, pp. 260-271.

(Continued)

*Primary Examiner* — Michael Pepitone
(74) *Attorney, Agent, or Firm* — MH2 Technology Law Group LLP

(57) ABSTRACT

A discrete nanostructure formed by a method comprising providing an aliphatic multi-block copolymer. The aliphatic multi-block copolymer includes at least one polyester block and at least one functionalized polycarbonate block. The aliphatic multi-block copolymer, a deprotonating agent and water are mixed to form an aqueous mixture. The aqueous mixture is maintained at a reaction temperature suitable to result in self-assembly of the multi-block copolymer into nanoparticles.

4 Claims, 3 Drawing Sheets

(56) References Cited

U.S. PATENT DOCUMENTS

2011/0152167 A1  6/2011  Hedrick et al.

OTHER PUBLICATIONS

Klishetti, N. et al., "Engineering of self-assembled nanoparticle platform for precisely controlled combination drug therapy", PNAS, Oct. 19, 2010, vol. 107, No. 42, pp. 17939-17944.
Noga, David E et al., "Synthesis and Modification of Functional Poly(lactide) Copolymers: Toward Biofunctional Vlaterials", Biomacromolecules 2008, 9, pp. 2056-2062.

* cited by examiner

METHOD FOR GENERATION OF NANOPARTICLES

CROSS-REFERENCE TO RELATED APPLICATIONS

This application is a divisional of U.S. patent application Ser. No. 13/938,555 filed Jul. 10, 2013, now U.S. Pat. No. 9,399,704, the disclosure of which application is hereby incorporated herein by reference in its entirety.

FIELD OF THE DISCLOSURE

The present disclosure is directed to a method for the generation of nanoparticles, and in particular, a method for self-assembly of aliphatic multi-block copolymers to form nanoparticles.

BACKGROUND

Block copolymer self-assembly using biodegradable components is an attractive means to generate discrete nanostructured materials for applications ranging from commodity items to drug delivery systems. The self assembly of polymeric nanoparticles from readily available and environmentally friendly materials is an active area of research across several disciplines.

One approach to assemble such structures is employing block copolymers with specific functionality expressed along the polymer chain designed to promote self-assembly.

Aliphatic polyesters are well-known for their low toxicity and biodegradability. Aliphatic polyesters, such as polycaprolactone and polylactide generated by ring-opening polymerization, represent a promising class of non-toxic and biodegradable polymers, and therefore their functionalization and self-assembly is a promising approach to generate complex soft materials. However introducing functionality into the chain of caprolactones and lactides remains a challenge. Known processes generally require multi-step syntheses, are not easily scaleable and/or suffer from poor yields.

A process for self assembly of nanoparticles that overcomes one or more of the problems of the prior art would be a welcome advance in the art.

SUMMARY

An embodiment of the present disclosure is directed to a method for self-assembly of a discrete nanostructure. The method comprises providing an aliphatic multi-block copolymer comprising at least one polyester block and at least one functionalized polycarbonate block; mixing the aliphatic multi-block copolymer, a deprotonating agent and water to form an aqueous mixture; and maintaining the aqueous mixture at a reaction temperature suitable to result in self-assembly of the multi-block copolymer into nanoparticles.

Another embodiment of the present disclosure is directed to a discrete nanostructure. The discrete nanostructure is formed by a method comprising: providing an aliphatic multi-block copolymer comprising at least one polyester block and at least one functionalized polycarbonate block; mixing the aliphatic multi-block copolymer, a deprotonating agent and water to form an aqueous mixture; and maintaining the aqueous mixture at a reaction temperature suitable to result in self-assembly of the multi-block copolymer into nanoparticles.

It is to be understood that both the foregoing general description and the following detailed description are exemplary and explanatory only and are not restrictive of the present teachings, as claimed.

BRIEF DESCRIPTION OF THE DRAWINGS

The accompanying drawings, which are incorporated in and constitute a part of this specification, illustrate embodiments of the present teachings and together with the description, serve to explain the principles of the present teachings.

Figure 1A:
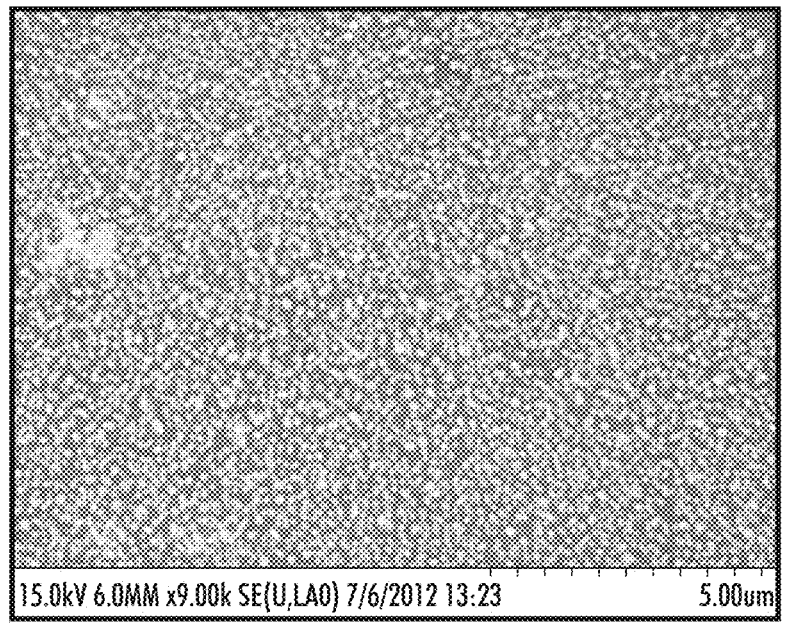
FIGS. 1A, 1B and 2 show SEM images of a cast solution of nanoparticles generated from a triblock copolymer, according to an example of the present disclosure.

It should be noted that some details of the figures may have been simplified and/or illustrated to facilitate understanding of the embodiments rather than to maintain strict structural accuracy, detail, and scale.

DESCRIPTION OF THE EMBODIMENTS

Reference will now be made in detail to embodiments of the present teachings, examples of which are illustrated in the accompanying drawings. In the drawings, like reference numerals have been used throughout to designate identical elements. In the following description, reference is made to the accompanying drawing that forms a part thereof, and in which is shown by way of illustration a specific exemplary embodiment in which the present teachings may be practiced. The following description is, therefore, merely exemplary.

The present application is directed to a method for self-assembly of discrete nanostructures, referred to herein as nanoparticles. The method comprises mixing an aliphatic multi-block copolymer, a deprotonating agent and water to form an aqueous mixture. The aliphatic multi-block copolymer includes at least one polyester block and at least one functionalized polycarbonate block. The aqueous mixture is maintained at a reaction temperature for a sufficient time to result in self-assembly of the multi-block copolymer into nanoparticles.

The aliphatic multi-block copolymers useful for forming nanoparticles of the present disclosure include at least one polyester block and at least one functionalized polycarbonate block. Examples of suitable polyesters include polycaprolactones and polylactides. Examples of suitable polycarbonates include polycarbonate groups functionalized with at least one carboxylic acid or ester thereof.

In an embodiment, the aliphatic multi-block copolymers are polyester-polycarbonate-polyester tri-block copolymers. Examples of suitable polyester-polycarbonate-polyester tri-block copolymers include compounds of formula 1:

$$R^1\text{—}O\text{-}A_aB_bC_c\text{—}R^2 \qquad (1)$$

where:
A and C are polyester blocks;
B is the functionalized polycarbonate block;
a=20 to 40;
b=2 to 10;
c=20 to 40;
$R^1$ is a group formed from a catalyst initiator; and
$R^2$ is an end cap moiety formed from a cyclic monomer.

The polyester blocks of the copolymers can be the same or different. In an embodiment, the copolymer can include a first polyester block of polycaprolactone and a second polyester block of polylactide. For example, block A of formula 1 can be a polyester formed by ring-opening polymerization of caprolactone and block C can be a polyester formed by ring-opening polymerization of lactide.

In an embodiment, the polycarbonate block of formula 1 is functionalized with a plurality of carboxylic acid or carboxylic acid ester functional groups. The functional groups can be any suitable pendant group on the B block that can promote self-assembly of block copolymers in an aqueous medium. For example, the functional groups can be carboxylic acid or carboxylic acid ester groups. Each polycarbonate B block can include any desired number of functional groups. For example, each B block can include 2 to 10 pendant functional groups, such as 2 to 5 or 2 to 3 functional groups.

A functionality protecting group can be attached to the functional group of the polycarbonate block. The protecting group can hinder the functional group from reaction until self-assembly reaction is desired, at which point the protecting group can be removed. Examples of suitable protecting groups include aromatic moieties, such as a benzyl group.

$R^1$ can vary depending on the catalyst initiator used to form the compounds of formula 1. Examples of suitable initiators are disclosed in co-pending U.S. Application No. [XEROX NO. 20111338], the disclosure of which is incorporated herein by reference in its entirety. In an embodiment, $R^1$ can be selected from the group consisting of alkyls, aryls, arylalkyls or alkylaryls. In an embodiment, $R^1$ has from 1 to 10 carbon atoms. Examples of suitable $R^1$ groups include benzyl, 2-phenylethyl and hexyl groups.

$R^2$ in the compound of formula 1 is an end-capping moiety use to improve stability and dispersability of the block copolymer. Any suitable end-capping moiety can be employed. In an embodiment, such end-cap moieties are derived from cyclic monomers. Examples of suitable cyclic monomers include cyclic anhydrides and aromatic monomers, such as naphthalene. Examples of cyclic anhydride monomers include dicarboxylic acid anydride and other polycarboxylic acid anhydrides, such as succinic anhydride, glutaric anhydride, phthalic anhydride and trimellitic anhydride. Other suitable end-capping groups are disclosed in co-pending application no. [XEROX NO. 20121505], the disclosure of which is incorporated herein by reference in its entirety.

Example polydispersity ranges for for the triblock copolymers of the present disclosure are from about 0.5 to about 2, such as about 0.8 to about 1.7, or about 1 to about 1.5. Example number average molecular weight ranges are about 1000 to about 100,000, such as about 2000 to about 50,000. Example weight average molecular weight ranges are about 1000 to about 300,000, or about 2000 to about 200,000. Molecular weights throughout the application are expressed in Daltons, unless otherwise specified.

The triblock copolymers of the present disclosure can be made by any suitable method. An example of a method for making the copolymer reactants employed herein involves the sequential addition of monomers and capping with succinic anhydride, as described in U.S. Patent Application Nos. [XEROX NOs. 20120964 and 20110562], the disclosures of which are incorporated herein by reference in their entirety.

Self-assembly of the above block copolymers can be carried out in the presence of a deprotonating agent in order to remove a proton (H+) from the carboxylic acid, which in turn will increase the hydrophilicity of the polycarbonate block. Any suitable deprotonating agent can be employed. In an embodiment, the deprotonating agent is a salt of bicarbonate, such as sodium bicarbonate.

The aliphatic multi-block copolymer, deprotonating agent and water can be combined in any order. Any suitable technique for mixing can be employed. High shear mixing is not required, although it can be used if desired. The mixture is heated to a reaction temperature ranging from about 20° C. to about 95° C., or from about 50° C. to about 90° C., or from about 70° C. to about 90° C.

Prior to, or simultaneous with, the mixing of the ingredients, the protecting group used to hinder reaction with the functional groups of the polycarbonate block can be removed from the copolymer. This allows self-assembly of the copolymers to proceed as desired. Any suitable technique can be employed to remove the protecting groups. An example of a suitable technique is disclosed in Al-Azemi, T. F. et al., *Macromolecules*, vol. 32, pp. 6536-6540 (1999), the disclosure of which is incorporated herein by reference in its entirety.

The self assembly reaction occurs readily in the absence of solvents other than water, although other solvents can also be employed, if desired. Examples of such solvents include mixtures of water with water-miscible alcohols, such as ethanol, methanol, isopropanol and n-propanol. The reaction can take place in either a batch or continuous type reactor.

The self assembly reaction results in an aqueous dispersion of nanoparticles. The median diameter of the nanoparticles range in size from about 5 nm to about 1000 nm, such as about 25 nm to about 500 nm, or about 50 nm to about 300 nm. If desired, the nanoparticles can be separated from the water solution and/or dried to form discrete nanoparticle structures.

In an embodiment, the nanoparticles are biodegradable. In an embodiment, one of more of the ingredients employed to make the nanoparticles, such as the multi-block copolymers, are biodegradable. In yet other embodiments, the nanoparticles and/or the ingredients employed to make the nanoparticles are not readily biodegradable.

EXAMPLES

The following example illustrates a process for the self-assembly of triblock copolymer product in reaction below, where a=30, b=6, c=34.

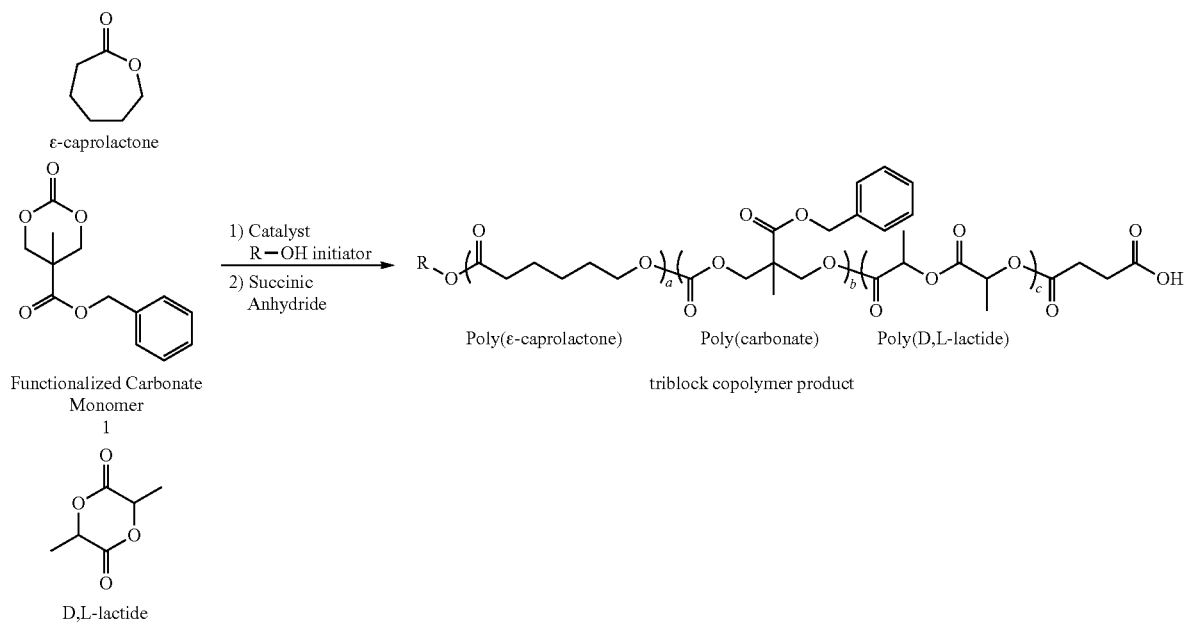

To a 16×125 mm test tube equipped with a small magnetic stir bar was added triblock copolymer (50 mg) and 5% NaHCO3 (aq) (5 ml). The mixture was heated to 90° C. for 18 hours at which time the mixture possessed a hazy blue hue. The sample was then removed from the heating bath and cooled for 1 hour at room temperature before casting samples for scanning electron microscopy.

Figure 1B:
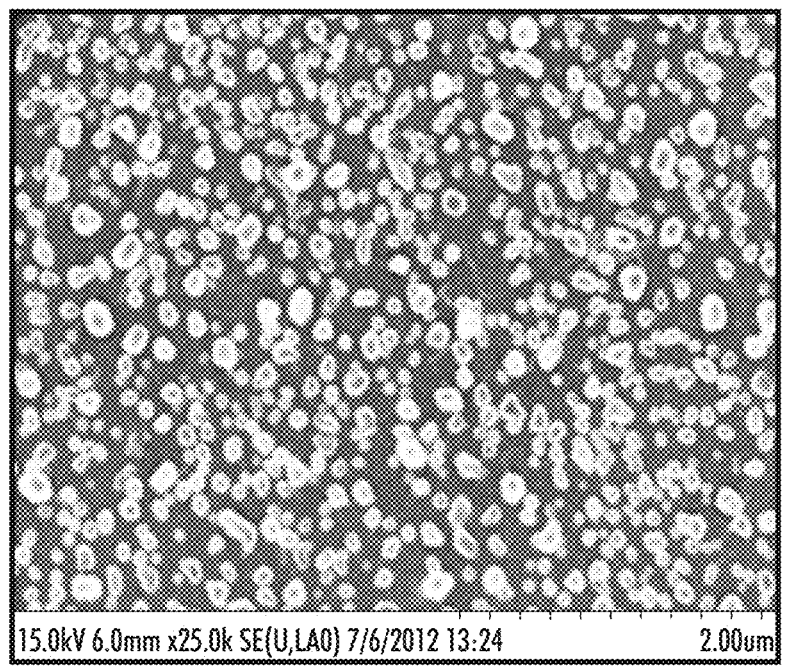
Figure 2:
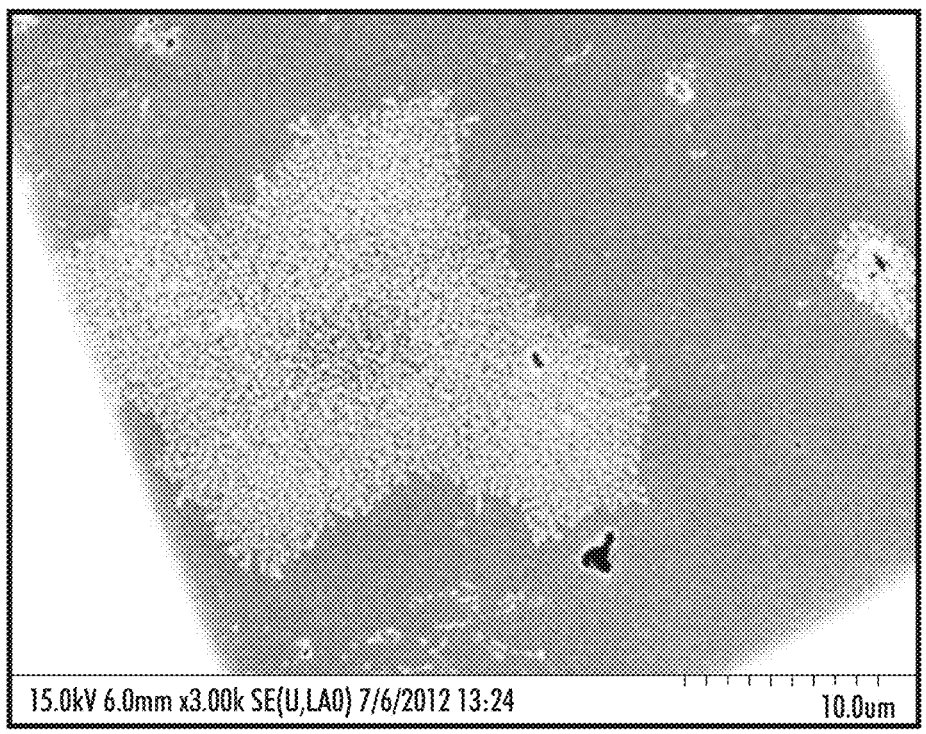
Figure 3:
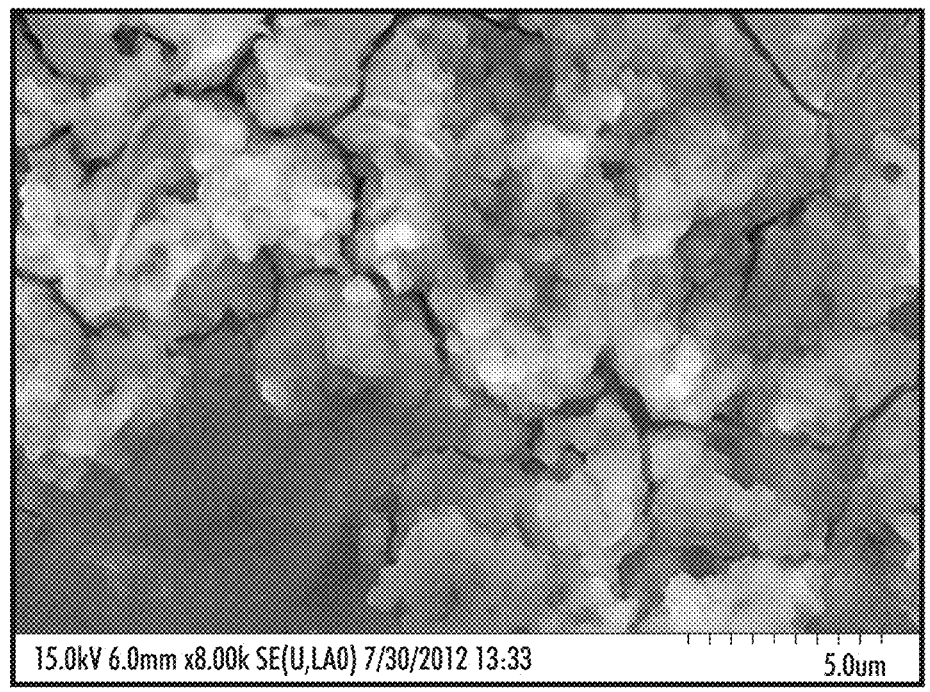
FIG. 3 shows an SEM image of agglomerated nanoparticles from an evaporated solution, according to an example of the present disclosure.

Images shown in FIGS. 1A, 1B and 2 were obtained by dropping the aqueous solution onto a carbon coated TEM grid, allowing it to set 10 seconds, then drawing off the liquid using a filter paper. Many of the particles are probably removed when the liquid is drawn off, however enough remain stuck to the grid to see several areas of agglomerated particles. The image shown in FIG. 2 was obtained by casting the aqueous solution onto an aluminum SEM stub and allowing it to evaporate overnight. The presence of NaHCO3 crystals and large areas of agglomerated particles are observed.

The SEM images confirm the self-assembly of tri-block amorphous-crystalline polyester-polycarbonate copolymers into nanoparticles ranging in size from 50-300 nm. The process employed is very simple. The powder polymer material is dispersed into a 5% sodium bicarbonate solution at elevated temperature for a period of time. Once the particles have undergone self-assembly, a blue hue for the solution appears. In an embodiment, high shear mixing and/or addition of solvents are not required for polymer nanoparticle self-assembly by the processes of the present disclosure.

Notwithstanding that the numerical ranges and parameters setting forth the broad scope of the disclosure are approximations, the numerical values set forth in the specific examples are reported as precisely as possible. Any numerical value, however, inherently contains certain errors necessarily resulting from the standard deviation found in their respective testing measurements. Moreover, all ranges disclosed herein are to be understood to encompass any and all sub-ranges subsumed therein.

While the present teachings have been illustrated with respect to one or more implementations, alterations and/or modifications can be made to the illustrated examples without departing from the spirit and scope of the appended claims. In addition, while a particular feature of the present teachings may have been disclosed with respect to only one of several implementations, such feature may be combined with one or more other features of the other implementations as may be desired and advantageous for any given or particular function. Furthermore, to the extent that the terms "including," "includes," "having," "has," "with," or variants thereof are used in either the detailed description and the claims, such terms are intended to be inclusive in a manner similar to the term "comprising." Further, in the discussion and claims herein, the term "about" indicates that the value listed may be somewhat altered, as long as the alteration does not result in nonconformance of the process or structure to the illustrated embodiment. Finally, "exemplary" indicates the description is used as an example, rather than implying that it is an ideal.

It will be appreciated that variants of the above-disclosed and other features and functions, or alternatives thereof, may be combined into many other different systems or applications. Various presently unforeseen or unanticipated alternatives, modifications, variations, or improvements therein may be subsequently made by those skilled in the art which are also intended to be encompasses by the following claims.

What is claimed is:

1. A discrete nanostructure formed by the method comprising:
   providing an aliphatic multi-block copolymer comprising at least one polyester block and at least one functionalized polycarbonate block, wherein the aliphatic multi-block copolymer is a polyester-polycarbonate-polyester tri-block copolymer of formula 1:

$$R^1-O-A_aB_bC_c-R^2 \quad (1)$$

where:
   A and C are polyester blocks;
   B is the functionalized polycarbonate block;
   a=20 to 40;
   b=2 to 10;

c=20 to 40;

$R^1$ is a group formed from a catalyst initiator; and $R^2$ is an end cap moiety formed from a cyclic monomer;

mixing the aliphatic multi-block copolymer, a deprotonating agent and water to form an aqueous mixture; and maintaining the aqueous mixture at a reaction temperature suitable to result in self-assembly of the multi-block copolymer into nanoparticles.

2. The discrete nanostructure of claim 1, wherein A is a polyester formed by ring-opening polymerization of caprolactone and C is a polyester formed by ring-opening polymerization of lactide.

3. The discrete nanostructure of claim 2, wherein the polycarbonate block is functionalized with a plurality of carboxylic acid or carboxylic acid ester functionalities.

4. The discrete nanostructure of claim 3, wherein the nanoparticles range in size from about 5 nm to about 1000 nm.

* * * * *